United States Patent
Yahya et al.

(10) Patent No.: US 6,363,401 B2
(45) Date of Patent: Mar. 26, 2002

(54) ENHANCED TWO-PHASE COMMIT PROTOCOL

(75) Inventors: Muhammad Yahya, Escondido; Devin Lyle Barnhart, San Diego; Jerry C. Lee, Vista; Thomas J. Jorgensen, San Diego; Richard G. Stellwagen, Jr., Poway, all of CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/166,690

(22) Filed: Oct. 5, 1998

(51) Int. Cl.[7] .............................................. G06F 17/30
(52) U.S. Cl. ............................ 707/202; 707/8; 707/10; 714/16
(58) Field of Search .............................. 707/10, 9, 8, 2, 707/204, 203, 202, 201; 709/101, 104; 714/4, 16

(56) References Cited

U.S. PATENT DOCUMENTS

| | | | |
|---|---|---|---|
| 4,412,287 A | 10/1983 | Braddock, III | 705/37 |
| 5,095,421 A | 3/1992 | Freund | 709/101 |
| 5,301,320 A | 4/1994 | McAtee et al. | 705/9 |
| 5,452,445 A | 9/1995 | Hallmark et al. | 707/2 |
| 5,455,952 A | 10/1995 | Russell | 717/1 |
| 5,530,848 A | 6/1996 | Gilbert et al. | 709/303 |
| 5,850,507 A | 12/1998 | Ngai et al. | 714/16 |
| 6,105,147 A | 8/2000 | Molloy | 714/16 |
| 6,154,849 A | * 11/2000 | Xia | 714/4 |

OTHER PUBLICATIONS

Reddy et al., "Reducing the blocking in two–phase commit protocol employing backup sites" IEEE catalog No. 98EX122, pp. 406–415, Aug. 20–22, 1998.
Ancilotti et al., "A distributed commit protocol for a multicomputer system" IEEE Transaction, vol. 39, No. 5, pp. 718–724, May 1990.
Ghafoor et al., "An efficient communication structure for distributed commit protocols", IEEE journal, vol. 7, No. 3, pp. 375–389, Apr. 1989.
Pui Ng, "A commit protocol for checkpointing transactions", Reliable distributed systems, pp. 22–31, Oct. 10–12, 1988.

* cited by examiner

Primary Examiner—Jean M. Corrielus
(74) Attorney, Agent, or Firm—Gates & Cooper

(57) ABSTRACT

A method, apparatus, and article of manufacture for performing a two-phase commit protocol for a transaction in a system having a plurality of data sources. An availability status is verified for all of the data sources, and the two-phase commit protocol for the transaction is completed for those data sources that are available, while the transaction is logged for data sources that are unavailable.

21 Claims, 4 Drawing Sheets

ENHANCED TWO-PHASE COMMIT PROTOCOL

BACKGROUND OF THE INVENTION

1. Field of the Invention.

The invention relates in general to computer systems, and more particularly, to an enhanced two-phase commit protocol for distributed data processing environments.

2. Description of Related Art.

In distributed data processing environments, two-phase commit protocols are used to coordinate transactions against one or more data sources. Transactions must be coordinated with other data sources in the network or system to ensure that the data sources have current information.

These data sources may include multiple databases distributed at several locations. In one embodiment of a two-phase commit protocol, the system first checks to see if all data sources are available, and, if so, proceeds to complete the transaction. However, if one or more of the data sources are unavailable or unable to complete the transaction, the transaction is canceled or "undone" until the data source (also known as a participant) is able to complete the transaction, or is queued until all participants are available to complete the transaction. The two-phase commit protocol is necessary for data environments that require high degrees of accuracy across large numbers of distributed computing systems, e.g., banking systems, credit card verification systems, databases for vital statistics, etc.

Although the two-phase commit protocol is useful to ensure data integrity, the limitation of requiring all participants to be able to process the transaction makes the two-phase commit protocol's usefulness limited. Further, since there are many times that a data source or other participant may be unable to accept or process the transaction due to hardware or software malfunctions, preventative maintenance, system reconfigurations, etc., the two-phase commit protocol has even less usefulness.

It can be seen, then, that there is a need in the art for a two-phase commit protocol that can be used when one or more participants are unable to process the transaction. It can also be seen, then, that there is a need in the art for a two-phase commit protocol that will allow those participants unable to participate in the initial database update to be updated once the participant is again able to participate in the transaction process.

SUMMARY OF THE INVENTION

To overcome the limitations in the prior art described above, and to overcome other limitations that will become apparent upon reading and understanding the present specification, the present invention discloses a method, apparatus, and article of manufacture for performing a two-phase commit protocol for a transaction in a system having a plurality of data sources. An availability status is verified for all of the data sources, and the two-phase commit protocol for the transaction is completed (committed) for those data sources that are available, while the transaction is logged for data sources that are unavailable. The approach used in the present invention allows for a wider application of the two-phase commit protocol for networks that require the accuracy and precision that the two-phase commit protocol delivers.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown byway of illustration a specific embodiment in which the invention may be practiced. It is to be understood that other embodiments may be utilized and structural changes may be made without departing from the scope of the present invention.

Overview

The present invention discloses a method, apparatus, and article of manufacture for performing a two-phase commit protocol for a transaction in a system having a plurality of data sources. An availability status is verified for all of the data sources, and the two-phase commit protocol for the transaction is completed for those data sources that are available, while the transaction is logged for data sources that are unavailable.

In a distributed data processing environment, a two-phase commit protocol is used to coordinate transactions between many data sources. Typically, the coordination is between databases, and the coordination is performed by a Transaction Manager. The two-phase commit protocol operates on an "all-or-nothing" approach; if one of the databases (data sources) is unavailable to complete the transaction, the transaction is not performed or is stored for completion at a later time.

For large systems that have many data sources, the two-phase commit protocol's usefulness is limited because, typically, one or more of the data sources is not available at any given time. Thus, any transaction that is scheduled to take place at a time when one of the data sources is unavailable cannot take place using a two-phase commit protocol until the unavailable data source becomes available.

The present invention enhances the two-phase commit protocol approach by allowing those data sources (also known as participants) that are available to complete the transaction, and storing the transaction for completion by the unavailable participants when they become available. The Transaction Manager uses the logical equivalent of a First-In-First-Out (FIFO) queue to ensure that all transactions are performed in the same order on all data sources within the computer system. The present invention allows the data sources to be synchronized in terms of transaction order by use of the logical FIFO construct.

Hardware Environment

Figure 1:
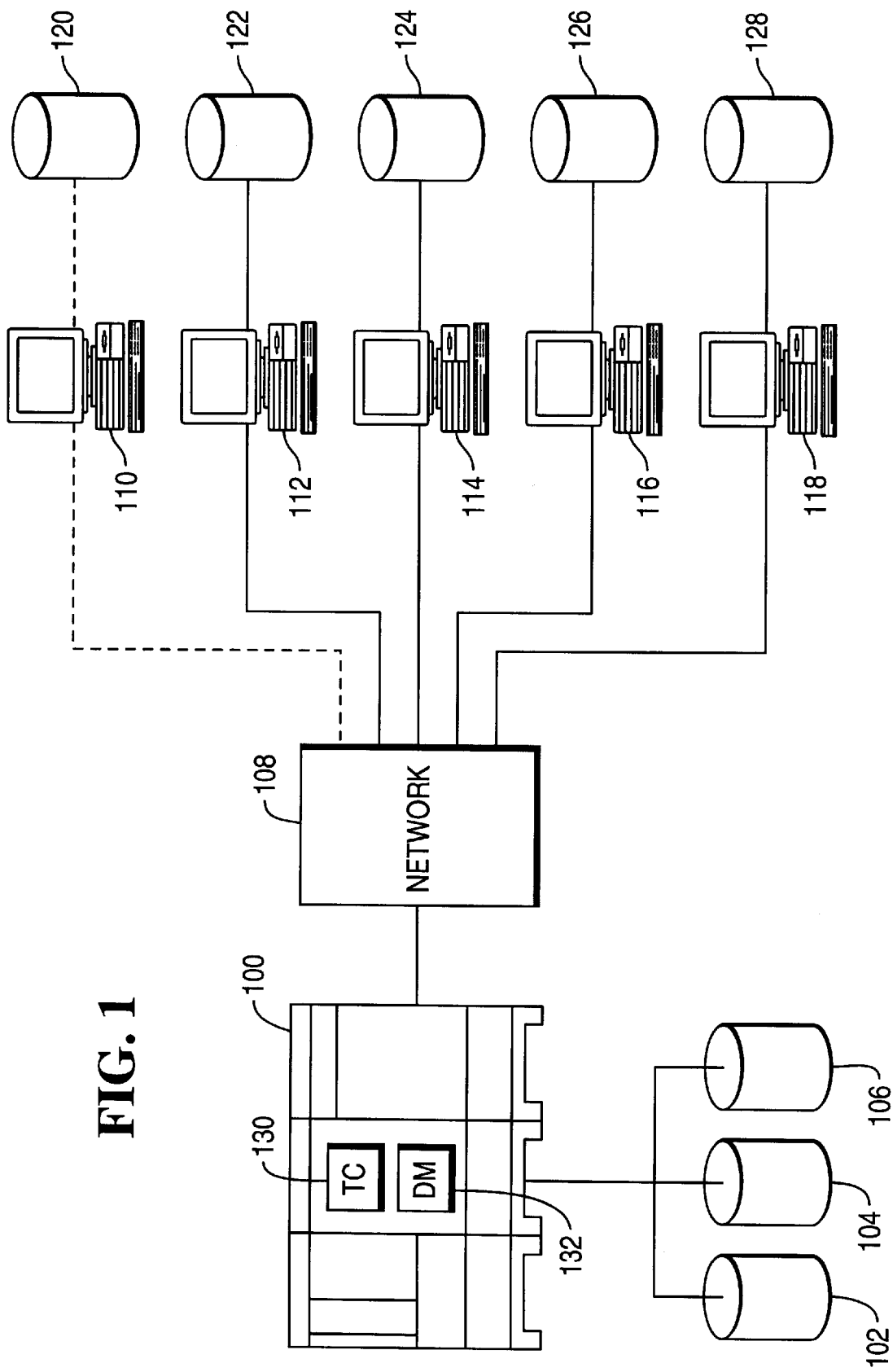
FIG. 1 is a block diagram that illustrates an exemplary hardware environment that could be used with the present invention.

FIG. 1 is an exemplary hardware environment used to implement the preferred embodiment of the invention. The present invention is typically implemented using a computer 100, which generally includes, inter alia, a processor, random access memory (RAM), data storage devices 102, 104, and 106 (e.g., hard, floppy, and/or CD-ROM disk drives, etc.). Computer 100 is coupled to other computers and/or data sources via network 108, using data communications devices (e.g., modems, network interfaces, etc.).

Through network 108, computer 100 is connected to and can communicate with computers 110, 112, 114, 116, and 118, and data sources 120, 122, 124, 126, and 128. The present invention is not limited to five data sources; there may be a larger or smaller number of data sources within the system.

Computer 100 executes transaction coordinator 130 and data manager 132. Transaction coordinator 130 and data manager 132 generally comprise data and/or instructions which, when read and executed by the computer 100, causes the computer 100 to perform the steps for performing and/or using the present invention. Generally, the data and/or instructions are embodied in and/or readable from a device, carrier, and/or media. For example, the data and/or instructions can be embodied in and/or readable from a memory, data storage device, remote devices coupled to the computer via a data communications device for downloading a file from a network to the computer as is done in client-server architectures and on the Internet, floppy diskettes, CD-ROM disks, or other magnetic, optical, electronic, or other storage media or devices that can be connected to and interpreted by the computer.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Many modifications may be made to this configuration without departing from the scope of the present invention.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Relationships and Operation

As shown in FIG. 1, data sources 120–128 are connected to network 108. In this configuration, data sources 120–128 can share data and can synchronize databases for uniformity. As an example, data sources 120–128 can be local databases for a banking system. A transaction in the banking system, e.g., a withdrawal of funds from an account, must be stored not only on the database closest to the geographical point of withdrawal; it must be stored on all databases within the banking system to ensure that the account is not overdrawn at some other location. As the withdrawal is taking place, the present invention allows for some of the data sources 120-128, whether it is the local data source or not, to be unavailable for update. This situation can occur, for example, when there is a power failure in a certain geographical area, one of the data sources 120–128 needs to be maintained, or for other reasons. The unavailability of one data source, data source 120, is shown as a dashed line in FIG. 1. For illustration purposes, the discussion herein refers to one data source 120 being unavailable; however, the present invention envisions one or more data sources 120–128 being unavailable for any given transaction. The discussion herein is extendable to encompass any number of data sources 120–128 being unavailable within the system.

When a transaction takes place, the two-phased commit protocol of the present invention is performed by the transaction coordinator 130 and the data manager 132. Transaction coordinator 130 checks to see the availability of data sources 120–128. In the example of FIG. 1, data source 120 is unavailable. The transaction coordinator 130 allows the transaction to be performed on data sources 122, 124, 126, and 128, and the data manager 132 stores the transaction on storage device 102. The data manager 132, in conjunction with the transaction coordinator 130, also identifies which of the data sources 120–128 were unavailable. In the example illustrated in FIG. 1, only data source 120 is unavailable, but data manager 132 can log any number of transactions and any number data sources that are unavailable to data storage device 102, which is called the data log. Storage device 102 then stores the transaction in a manner consistent with a FIFO queue, to allow the transaction to be time-ordered properly.

Once data source 120 becomes available, transaction coordinator 130 sends a signal to data manager 132, which checks data storage device 102 to see if there are any transactions that need to be logged to data source 120. If there are, data manager 132 routes those transactions stored in data storage device 102 in time-ordered fashion to data source 120. This action of sending the logged transactions synchronizes data source 120 with data sources 122–128.

Logic of the Database Replicator

Figure 2A:
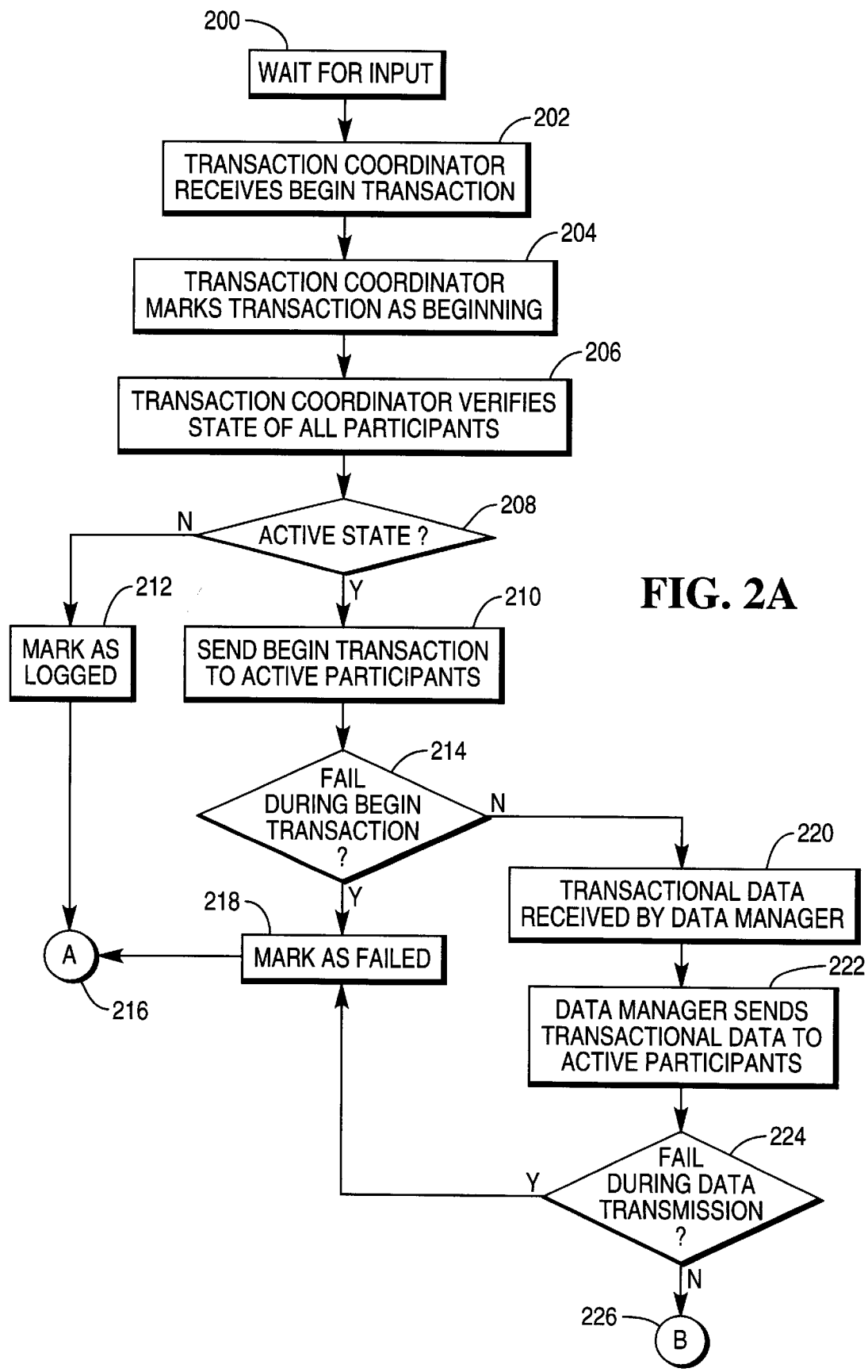
FIGS. 2A–2C are flowchart that illustrates exemplary logic performed by the controller according to the present invention.
Figure 2B:
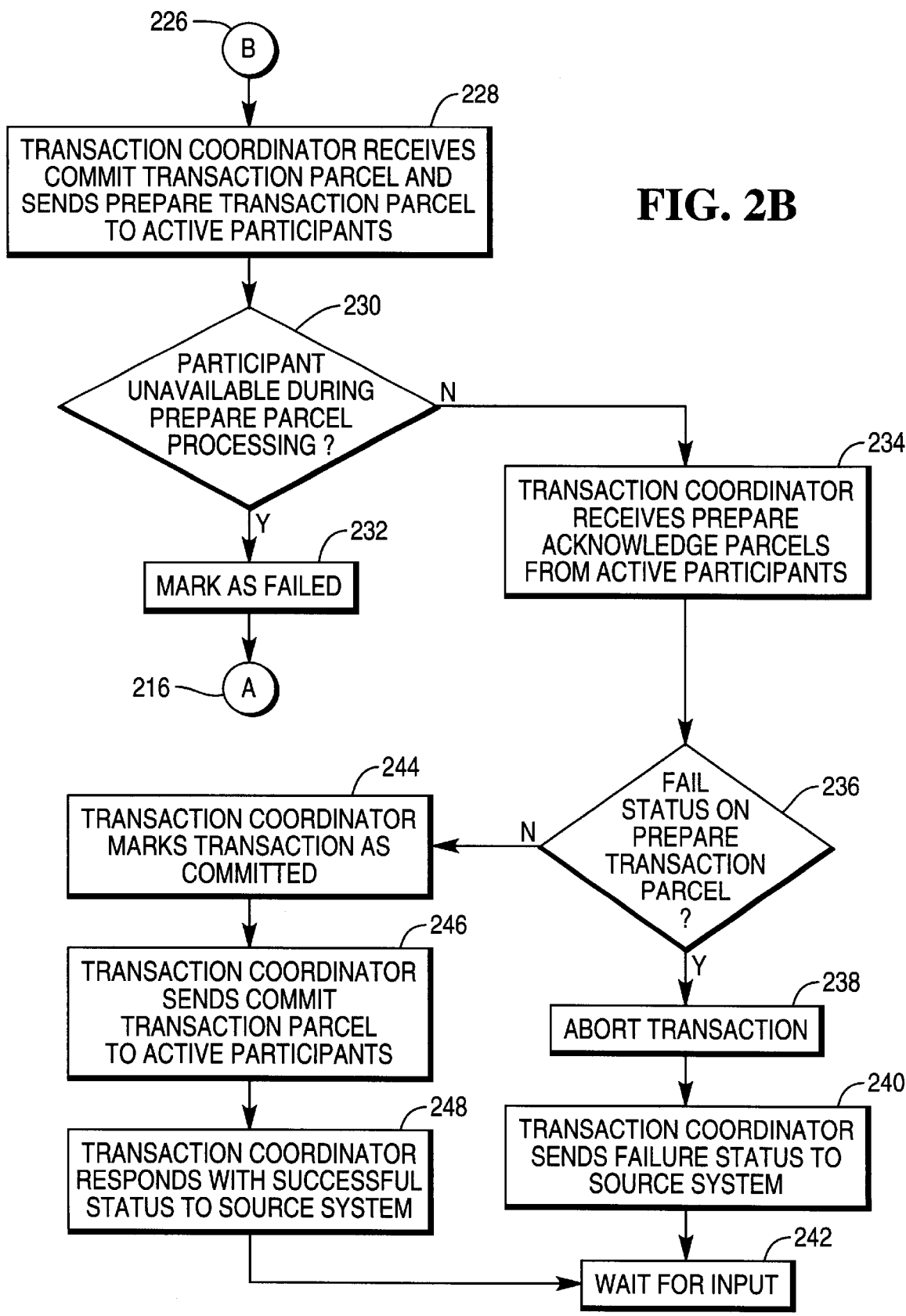
Figure 2C:
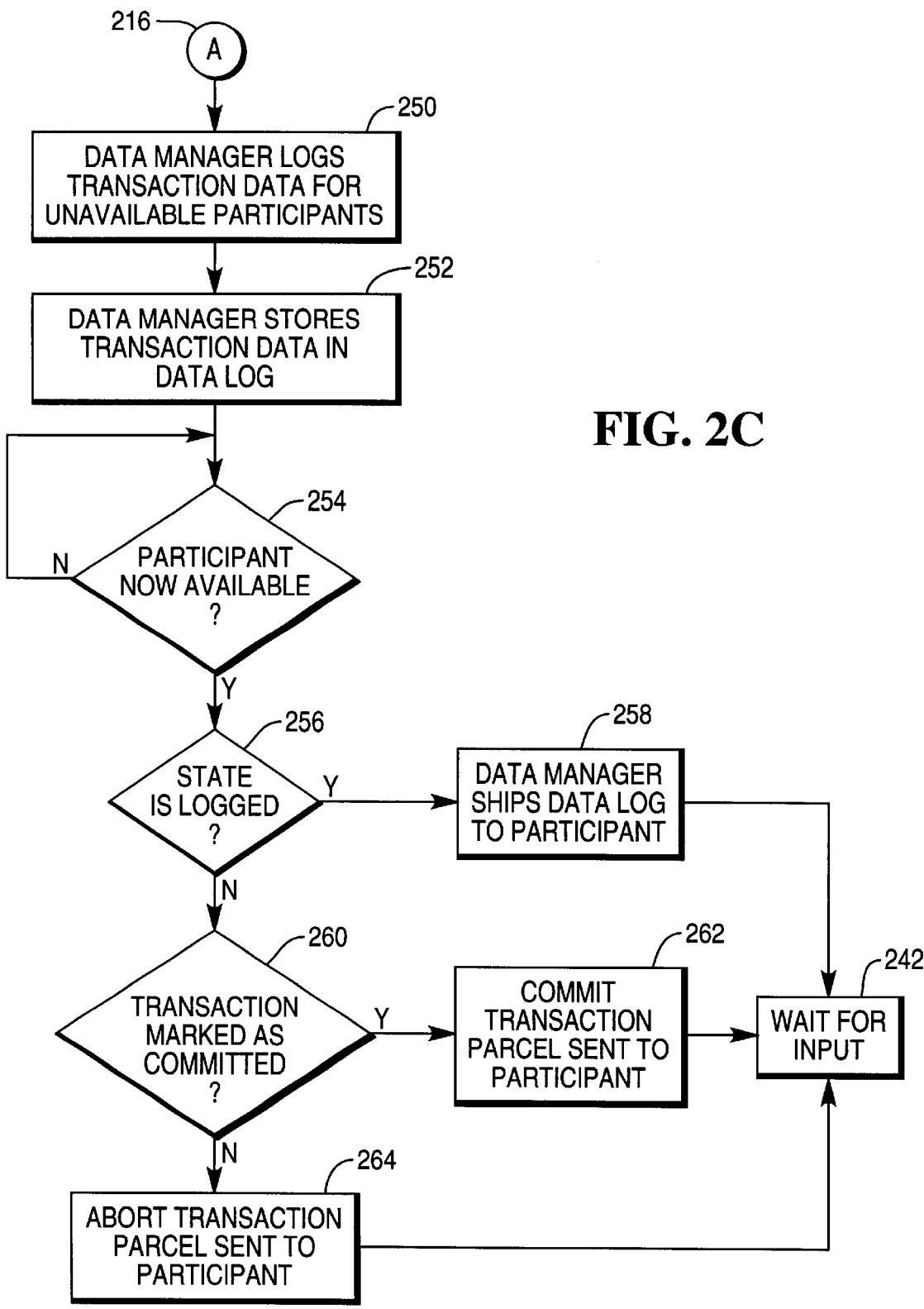

FIGS. 2A–2C are flowcharts that illustrate exemplary logic performed by the transaction coordinator 130 and data manager 132 according to the present invention.

Block 200 represents the computer 100 waiting for an event. If the event is a transaction, computer 100 uses the exemplary logic of FIGS. 2A–2C; otherwise, other functions and/or logic is performed by the computer 100.

Block 202 represents the transaction coordinator 130 receiving a "begin transaction" request from a data source 120–128. Control then transfers to block 204, which represents the transaction coordinator 130 marking the transaction as beginning. Control then transfers to block 206, which represents the transaction coordinator 130 verifying the status of all participants in the system. The status of all participants is noted and recorded by the transaction coordinator. The remainder of the flowcharts of FIGS. 2A–2C are dependent on the status recorded for each data source 120–128. The discussion relating to the remainder of FIGS. 2A–2C is a tree structure to enable transaction coordinator 130 to mark all data sources 120–128 and traverse the flowchart in a parallel and/or serial fashion.

Once transaction coordinator 130 has recorded the status of all data sources 120–128, control passes to block 208, which is a decision block representing the transaction coordinator 130 verifying the status of all data sources 120–128. For those data sources 120–128 that are in the "Active" state, control passes to block 210. For those data sources 120–128 that are not active, control passes to block 212. Block 210 represents the transaction coordinator 130 sending a "begin transaction" message to all active data sources 120–128. Control then transfers to decision block 214.

Block 212 represents the transaction coordinator 130 marking the status of nonactive data source 120–128 as "logged." In the example of FIG. 1, data source 120 would be marked as having a logged status. Control then passes to point A 216.

Block 214 is a decision block representing transaction coordinator 130 determing whether data sources 120–128 failed during the begin transaction sequence initiated in block 210. If the data sources 120–128 report to the transaction coordinator 130 that they have failed, then control transfers to block 218 for those data sources 120–128 that failed, and transaction coordinator 130 marks those data sources 120–128 as having a "failed" status. Control then transfers to point A 216.

For those data sources 120–128 that do not fail during the begin transaction sequence of block 210, control passes to block 220, which represents the data manager 132 receiving transactional data. Control then transfers to block 222, which represents the data manager 132 sending the transactional data to the active data sources 120–128. Control then transfers to block 224.

Block 224 is a decision block that represents the transaction coordinator 130 determining whether any of the data sources 120–128 failed during the data transmission sequence of blocks 220 and 222. If any of the data sources 120–128 did fail, control transfers to block 218, where the failed data sources 120–128 are marked as failed. If none of the data sources 120–128 failed, control transfers to point B 226.

Referring now to FIG. 2B, from point B 226, control transfers to block 228, where the transaction coordinator receives a commit transaction parcel command and sends a prepare transaction parcel to the active participants in the network. Control then transfers to decision block 230.

Decision block 230 is a decision block representing the computer determining whether any of the participants 120–128 have become unavailable during the prepare parcel processing. If so, the participants 120–128 that have become unavailable are marked as failed in block 232, and control passes to point A 216. If not, the transaction coordinator receives a prepare acknowledge parcels from the active participants. Control then transfers to decision block 236.

Decision block 236 is a decision block representing the transaction coordinator 130 determining whether any of the participants have sent a fail status during the prepare transaction parcel processing. If so, control transfers to block 238, where the transaction coordinator 130 aborts the transaction. Control then transfers to block 240, where the transaction coordinator 130 sends a failure status to the source system 100. Control then transfers to block 242, where the transaction coordinator 130 waits for additional input.

If there is not a fail status detected in block 236, control transfers to block 244, where transaction coordinator 130 marks the transaction as committed. Control then transfers to block 246, where the transaction coordinator 130 sends the commit transaction parcel to the active participants 120–128. Control then transfers to block 248, where the transaction coordinator 130 responds with a successful status parcel to the source system 100, and then transfers control to block 242, where transaction coordinator 130 waits for additional input.

Referring now to FIG. 2C, point A 216 transfers control to block 250, which represents the data manager 132 logging transaction data for the participants 120–128 that are unavailable. Control then transfers to block 252, where data manager 132 stores the transaction data in a data log for those participants 120–128 that are unavailable. Control then transfers to block 254, which represents data manager 132 determining whether a participant 120–128 that was previously unavailable is now available to send transaction data to. If there are no new participants 120–128, control loops around block 254. If there is a new participant 120–128, control transfers to block 256, where data manager 132 determines if the state of the new participant 120–128 is marked as logged. If so, control passes to block 258, where the data manager 132 ships the data log to the participant 120–128. Control then passes to block 242, where data manager 132 waits for additional input.

If the state of the new participant 120–128 was not logged, control passes to decision block 260, where data manager 132 determines if the transaction was marked as committed. If so, control transfers to block 262, where the data manager 132 sends the commit transaction parcel to the new participant 120–128. If not, control passes to block 264, where the data manager 132 sends the abort transaction parcel to the new participant 120–128. Control transfers from blocks 262 and 264 to block 242.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program utilizing (either partially or entirely) a database could benefit from the present invention.

In summary, the present invention discloses a method, apparatus, and article of manufacture, for performing a two-phase commit protocol for a transaction in a system having a plurality of data sources. An availability status is verified for all of the data sources, and the two-phase commit protocol for the transaction is completed for those data sources that are available, while the transaction is logged for data sources that are unavailable.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a two-phase commit protocol for a transaction in a system having a plurality of data sources, comprising the steps of:

verifying a status of all of the data sources during at least one point in time during the transaction;

continuing with the two-phase commit protocol by completing the transaction with a transaction controller for any of the data sources that have an available status at the time of verification regardless of whether there are remaining ones of the data sources that have an unavailable status at the time of verification; and logging the transaction for the remaining ones of the data sources that have an unavailable status at the time of verification, so that the transaction may be completed when the data sources that have an unavailable status later come to have an available status.

2. The method of claim 1, wherein at least one of the data sources is a database.

3. The method of claim 1, further comprising the step of completing the logged transaction for unavailable data sources when the unavailable data sources become available data sources.

4. The method of claim 3, wherein the step of completing further comprises step of completing the logged transaction in a time ordered sequence.

5. The method of claim 1, further comprising the steps of reverifying the status of a data source that previously had the available status but has an unavailable status at the time of reverification; and logging a remainder of the transaction for the data source that has an unavailable status at the time of reverification.

6. The method of claim 1, wherein the step of logging is performed by a data manager.

7. The method of claim 1, wherein the step of logging further comprises the step of storing the transaction in a data log.

8. A computer controlled device for continuous access to a database coupled to a plurality of data sources, comprising:

(a) means, performed by the computer, for verifying a status of all of the data sources;

(b) means, performed by the computer, for completing a two-phase commit protocol by completing a transaction with any of the data sources having an available status regardless of whether there are remaining ones of the data sources that have an unavailable status at the time of verification; and (c) means, performed by the computer, for logging the transaction for the remaining ones of the data sources having an unavailable status, so that the transaction may be completed when the data sources that have an unavailable status later come to have an available status.

9. The computer controlled device of claim 8, wherein at least one of the data sources is a database.

10. The computer controlled device of claim 8, further comprising the step of completing the logged transaction for unavailable data sources when the unavailable data sources become available data sources.

11. The computer controlled device of claim 10, wherein the step of completing further comprises step of completing the logged transaction in a time ordered sequence.

12. The computer controlled device of claim 8, further comprising the steps of reverifying the status of a data source that previously had the available status but has an unavailable status at the time of reverification; and logging a remainder of the transaction for the data source that have an unavailable status at the time of reverification.

13. The computer controlled device of claim 8, wherein the step of logging is performed by a data manager.

14. The computer controlled device of claim 8, wherein the step of logging further comprises the step of storing the transaction in a data log.

15. A program storage device, readable by a computer, tangibly embodying one or mote programs of instructions executable by the computer to perform method steps of increasing access to a database coupled to a plurality of data sources, comprising the steps of:

verifying a status of any of the data sources during at least one point in time during a transaction;

continuing with a two-phase commit protocol by completing the transaction with a transaction controller for any of the data sources that have an available status at the time of verification regardless of whether there ate remaining ones of the data sources that have an unavailable status at the time of verification; and logging the transaction for the remaining ones of the data sources that have an unavailable status at the time of verification, so that the transaction may be completed when the data sources that have an unavailable status later come to have an available status.

16. The program storage device of claim 15, wherein at least one of the data sources is a database.

17. The program storage device of claim 15, further comprising the step of completing the logged transaction for unavailable data sources when the unavailable data sources become available data sources.

18. The program storage device of claim 17, wherein the step of completing further comprises step of completing the logged transaction in a time ordered sequence.

19. The program storage device of claim 15, further comprising the steps of reverifying the status of a data source that previously had the available status but has an unavailable status at the time of reverification; and logging a remainder of the transaction for the data source that has an unavailable status at the time of reverification.

20. The program storage device of claim 15, wherein the step of logging is performed by a data manager.

21. The program storage device of claim 15, wherein the step of logging further comprises the step of storing the transaction in a data log.

* * * * *

UNITED STATES PATENT AND TRADEMARK OFFICE
CERTIFICATE OF CORRECTION

PATENT NO. : 6,363,401 B2
DATED : March 26, 2002
INVENTOR(S) : M. Yahya et al.

It is certified that error appears in the above-identified patent and that said Letters Patent is hereby corrected as shown below:

Column 8,
Line 5, delete "mote" and insert -- more --

Signed and Sealed this

Fourth Day of January, 2005

JON W. DUDAS
*Director of the United States Patent and Trademark Office*